United States Patent
Chun et al.

(10) Patent No.: US 7,473,023 B2
(45) Date of Patent: Jan. 6, 2009

(54) BACKLIGHT ASSEMBLY AND LIQUID CRYSTAL DISPLAY APPARATUS HAVING THE SAME

(75) Inventors: Jae-Hwan Chun, Suwon-si (KR); Hee-Sun Kim, Yongin-si (KR); Hyo-Suck Chun, Suwon-si (KR); Seung-Je Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 182 days.

(21) Appl. No.: 11/054,727

(22) Filed: Feb. 10, 2005

(65) Prior Publication Data
US 2005/0180168 A1     Aug. 18, 2005

(30) Foreign Application Priority Data
Feb. 18, 2004    (KR)    .................. 10-2004-0010584

(51) Int. Cl.
F21V 7/04    (2006.01)
(52) U.S. Cl. ........................ 362/634; 362/368
(58) Field of Classification Search .................. 362/623, 362/625, 626, 632, 633, 634, 368, 628
See application file for complete search history.

(56) References Cited

U.S. PATENT DOCUMENTS

| | | | |
|---|---|---|---|
| 6,715,896 B2 * | 4/2004 | Kawashima et al. | 362/613 |
| 6,979,114 B2 * | 12/2005 | Kao | 362/633 |
| 7,070,315 B2 * | 7/2006 | Choi | 362/628 |
| 7,153,017 B2 * | 12/2006 | Yamashita et al. | 362/606 |
| 2002/0164913 A1 | 11/2002 | Pieters | 442/327 |
| 2003/0164913 A1 | 9/2003 | Ogawa | |

FOREIGN PATENT DOCUMENTS

| | | |
|---|---|---|
| CN | 1441298 A | 9/2001 |
| CN | 1442734 A | 9/2002 |
| EP | 1 341 030 A1 | 9/2003 |
| EP | 1341030 A1 | 9/2003 |
| JP | 2002-098960 | 4/2002 |
| WO | 2004011997 A1 | 2/2004 |
| WO | WO 2004/011997 A1 | 2/2004 |
| WO | WO2004011997 | 2/2004 |

OTHER PUBLICATIONS

European Search Report; Application No. EP 05 00 2591; dated: May 23, 2005.
European Office Action referencing application No. 05 002 591.5; Date: Mar. 28, 2006 All the references cited in the Search Report are listed above.

* cited by examiner

Primary Examiner—John A Ward
(74) Attorney, Agent, or Firm—Cantor Colburn LLP (57) ABSTRACT

A backlight assembly includes a lamp assembly generating light, a light guide plate changing a path of light incident from the lamp assembly, a receiving container having a bottom part and a side part vertically extending from the bottom part and forming a receiving space, and an adhesive member fixing the light guide plate to the receiving container. The light guide plate includes a prism pattern on a surface, and the adhesive member is attached to a light-adjusting portion opposite to the lamp assembly. Therefore, the light guide plate may be affixed to the receiving container without additional structure and the appearance of the backlight assembly may be improved by preventing modification of the prism pattern.

21 Claims, 14 Drawing Sheets

BACKLIGHT ASSEMBLY AND LIQUID CRYSTAL DISPLAY APPARATUS HAVING THE SAME

BACKGROUND OF THE INVENTION

1. Field of the Invention

The present invention relates to a backlight assembly and a liquid crystal display apparatus having the same, more particularly, to a backlight assembly having a light guide plate having a prism pattern formed on a top and/or bottom surface thereof for providing high illumination.

2. Description of the Related Art

Generally, a liquid crystal display device includes a liquid crystal panel including a Thin Film Transistor (TFT) substrate, a color filter (CF) substrate opposite to the TFT substrate, and a liquid crystal disposed between the TFT and CF substrates. The liquid crystal display device further includes a backlight assembly for supplying light.

The backlight, assembly includes at least one lamp, a light guide plate (LGP) for guiding the light from the at least one lamp toward the liquid crystal panel, a reflecting sheet positioned beneath the LGP for reflecting leakage light, optical sheets for improving the optical characteristics of the light from the LGP, and a receiving container for receiving these components.

Recently, a Prism LGP providing high illumination at a low cost has been developed. The Prism LGP has a fine pitch of prism patterns on a bottom surface, and thus provides high illumination without additional optical sheets. However, since the Prism LGP has the prism pattern on the bottom surface, it does not have a good appearance. For example, in securing the Prism LGP in the receiving container, some problems are experienced. Due to the nature of the attachment of the Prism LGP to the receiving container, dark portions are generated around part of the Prism LGP. Further, a shape of the prism pattern on the Prism LGP is transformed by the receiving container.

SUMMARY OF THE INVENTION

An embodiment of the present invention provides a backlight assembly capable of improving the appearance by securing the Prism LGP. The backlight assembly comprises a lamp assembly configured to include a lamp and a lamp reflecting plate, a light guide plate configured to change a path of light from the lamp assembly; a receiving container configured to include a bottom part, and a side part extending from the bottom part to receive the lamp assembly and the light guide plate; and an adhesive member configured to affix the light guide plate to the receiving container.

Anther embodiment of the present invention provides a liquid crystal display device having the backlight assembly. The liquid crystal display device comprises a backlight assembly configured to include a lamp assembly having a lamp and a lamp reflecting plate, a light guide plate changing a path of light from the lamp assembly, a receiving container having a bottom part and a side part extending from the bottom part to receive the lamp assembly and the light guide plate, and an adhesive member fixing the light guide plate to the receiving container; a display unit configured to display images by using light from the backlight assembly; and a top chassis configured to fix the backlight assembly to the display unit.

These and other objects, features and advantages of the present invention will become apparent from the following detailed description of illustrative embodiments thereof, which is to be read in connection with the accompanying drawings.

This application relies for priority upon Korean Patent Application No. 2004-10584 filed on Feb. 18, 2003, the contents of which are herein incorporated by reference in its entirety.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Hereinafter the embodiments of the present invention will be described in detail with reference to the accompanied drawings.

Figure 1:
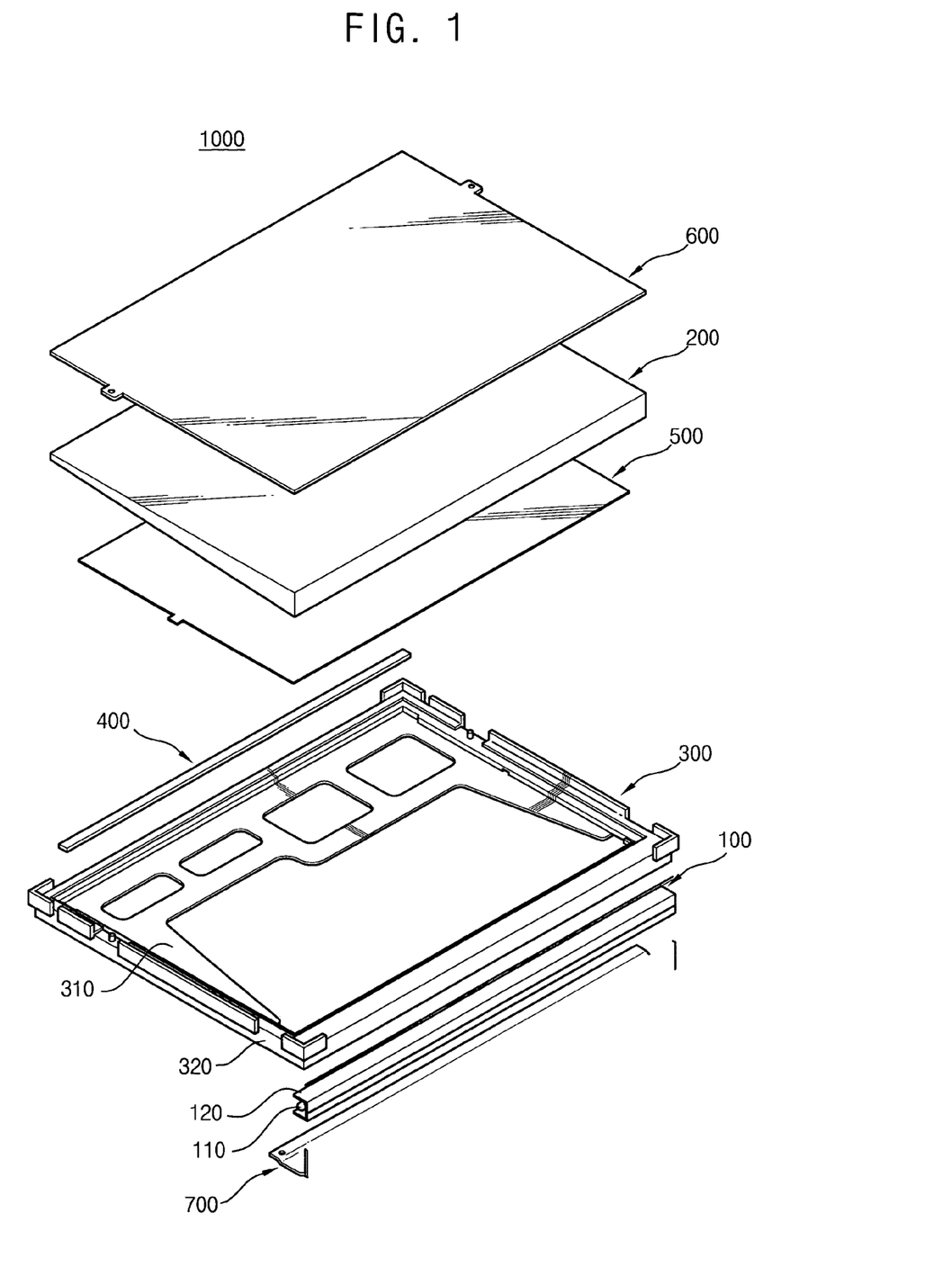
FIG. 1 is a cut out perspective view showing a backlight assembly according to an embodiment of the present invention.

FIG. 1 is a cut out perspective view showing a backlight assembly according to an embodiment of the present invention. Referring to FIG. 1, the backlight assembly 1000 includes a lamp assembly 100, a Light Guide Plate (LGP) 200, a receiving container 300, and an adhesive member 400. The lamp assembly 100 includes at least one lamp 110 emitting light, and a lamp reflecting plate 120 that protects the lamp 110 and reflects the light toward the LGP 200. The lamp assembly 100 is received at one side of the receiving container 300.

The lamp 110 includes a Cold Cathode Fluorescent Lamp (CCFL) with a stripe shape. The lamp reflecting plate 120 is made of high reflectance material. Alternately, the reflecting plate may be implemented by a reflective coating on a surface of the lamp 110. According to this configuration, the lamp reflecting plate 120 improves light efficiency by reflecting the light from the lamp 110 toward the LGP 200.

The LGP 200 is received in an inner space of the receiving container 300. The LGP 200 receives light from the lamp assembly 100 and vertically outputs the light. The LGP 200 may be wedge-shaped tapering in thickness away from lamp 110. A first prism pattern is formed on the bottom surface of the LGP 200 for redirecting the light heading towards the bottom surface of the LGP 200 towards the top surface of the LGP 200.

The receiving container 300 includes a bottom portion 310, and a side portion 320 vertically extending from the bottom portion 310 forming a receiving space, that receives the lamp assembly 100 and the LGP 200. The adhesive member 400 is mounted at one side of the LGP 200 and fixes the LGP 200 to the receiving container 300.

The backlight assembly 1000 further includes a reflecting sheet 500 positioned at the bottom surface of the LGP 200 and an optical sheet 600 positioned at the top surface of the LGP 200. The reflecting sheet 500 reflects leakage light from the LGP 200 back towards the LGP 200. The reflecting sheet 500 is made of a reflecting material. The reflecting sheet 500 is formed, for example, by coating a base film with the reflecting material. The optical sheet 600 is positioned at the top surface of the LGP 200 for improving the illumination characteristics from the LGP 200.

The optical sheet 600 includes a reverse prism sheet for improving the front illumination from the LGP 200. On the bottom of the optical sheet 600 facing the top of the LGP 200, a second prism pattern is formed. The optical sheet 600 may further include at least one diffusion sheet. The diffusion sheet may be positioned at the top or bottom of the optical sheet 600 and diffuses the light from the LGP 200 or the optical sheet 600 to improve uniformity of illumination. Further, it should be noted that the diffusion sheet or a separate prism sheet may be added or omitted based on the desired illumination characteristics. Alternately, instead of an optical sheet 600, the top surface of the LGP 200 may be patterned with prisms or other structure to improve the illumination characteristics (e.g. intensity, diffusion) from the LGP 200.

The backlight assembly 1000 further includes a back cover 700 for conducting heat generated by the lamp assembly 100 away from the backlight assembly 1000. The back cover 700 is connected with the receiving container 300 to cover the sides and the bottom of the lamp reflecting plate 120

Figure 2:
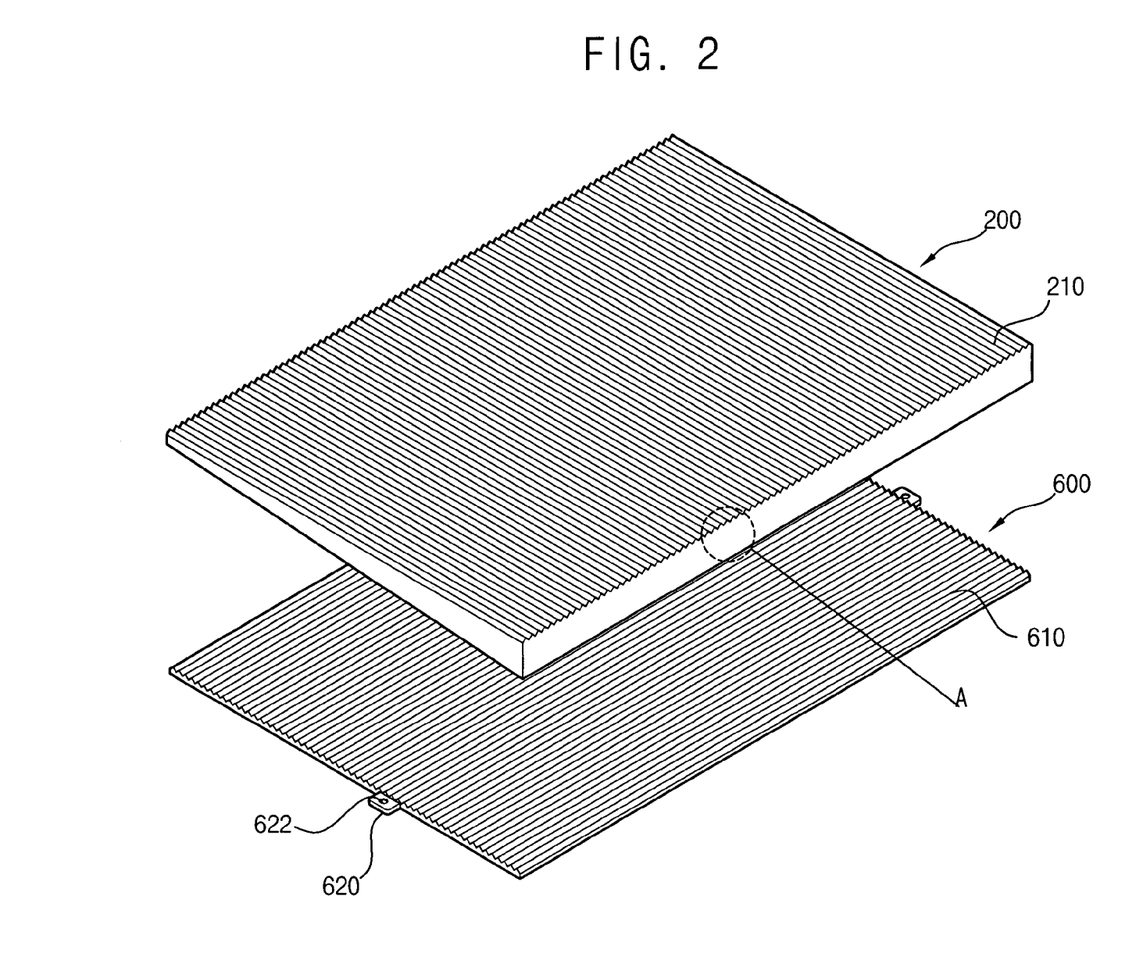
FIG. 2 is a perspective view showing the bottom surfaces of a light guide plate and optical sheet shown in FIG. 1.
Figure 3:
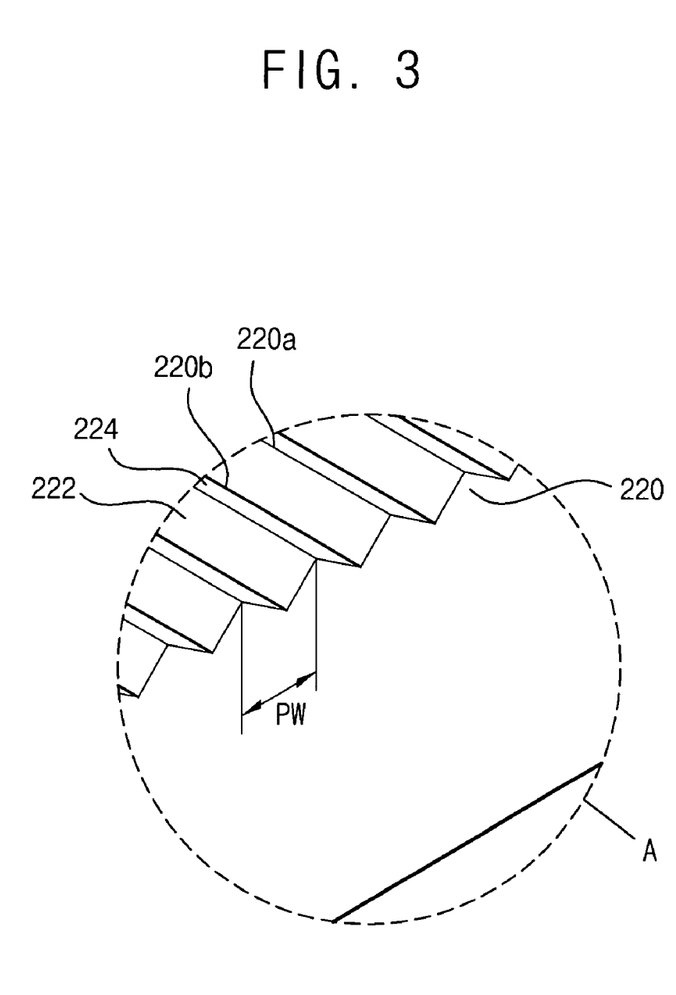
FIG. 3 is an enlarged view of region "A" shown in FIG. 2.

FIG. 2 is a perspective view showing the bottom surface of the LGP and an optical sheet 600 shown in FIG. 1. FIG. 3 is an enlarged view of region "A" shown in FIG. 2.

Referring to FIGS. 2 and 3, the LGP 200 is wedge-shaped having a first prism pattern 210 that is formed on its bottom surface facing the bottom part 310 of the receiving container 300. The first prism pattern 210 includes a plurality of first prisms 220 each having a triangular shape. Each first prism 220 has a longitudinal axis perpendicular to the longitudinal axis of the lamp assembly 100. Each first prism 220 includes a first inclined surface 222 and a second inclined surface 224, and forms a peak 220a and a valley 220b in contact with the first and second inclined surfaces 222 and 224 together. The inside angel between the first and second inclined surfaces 222 and 224 is approximately 120° and the distance (PW) between the adjacent peaks 220a or between the adjacent valleys 220b is approximately 50um~60um. However, the first prism pattern 210 may have various modifications in view of desired illumination characteristics. Therefore, the LGP 200 may improve illumination by forming the first prism pattern 210 on the bottom surface of the LGP 200.

The optical sheet 600 is positioned on the top of the LGP 200. A second prism pattern 610 is formed on the bottom surface of the optical sheet 600 facing the top surface of the LGP 200. The second prism pattern 610 has a plurality of parallel second prisms (not shown) each having a triangular shape. Each second prism has a longitudinal axis parallel to the longitudinal axis of the lamp assembly 100.

Therefore, the embodiments of the present invention may improve illumination without a separate optical sheet by forming the first and second prisms 210 and 610 on the bottom surfaces of the LGP 200 and the optical sheet 600, respectively.

The optical sheet 600 further includes a first sheet fixing part 620 being formed corresponding one of the sides of the optical sheet 600. The first sheet fixing part 620 extends from the corresponding side of the optical sheet 600 and is fixed to the corresponding one of sides of the receiving container 300. A fixing hole 622 is formed on the center of the first sheet fixing part 620 for connecting with the receiving container 300.

Figure 4:
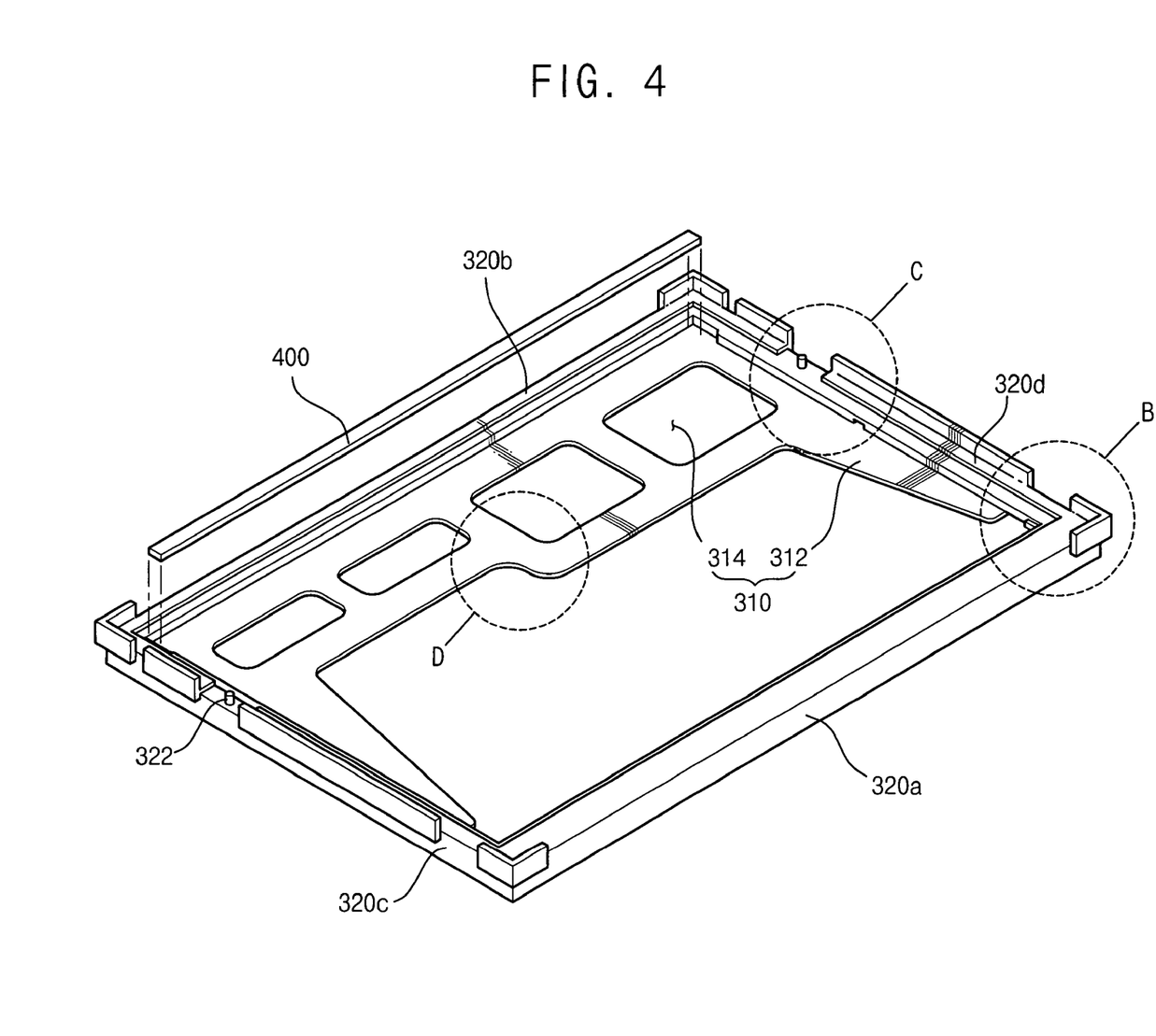
FIG. 4 is a perspective view showing a receiving container and an adhesive member shown in FIG. 1.
Figure 5:
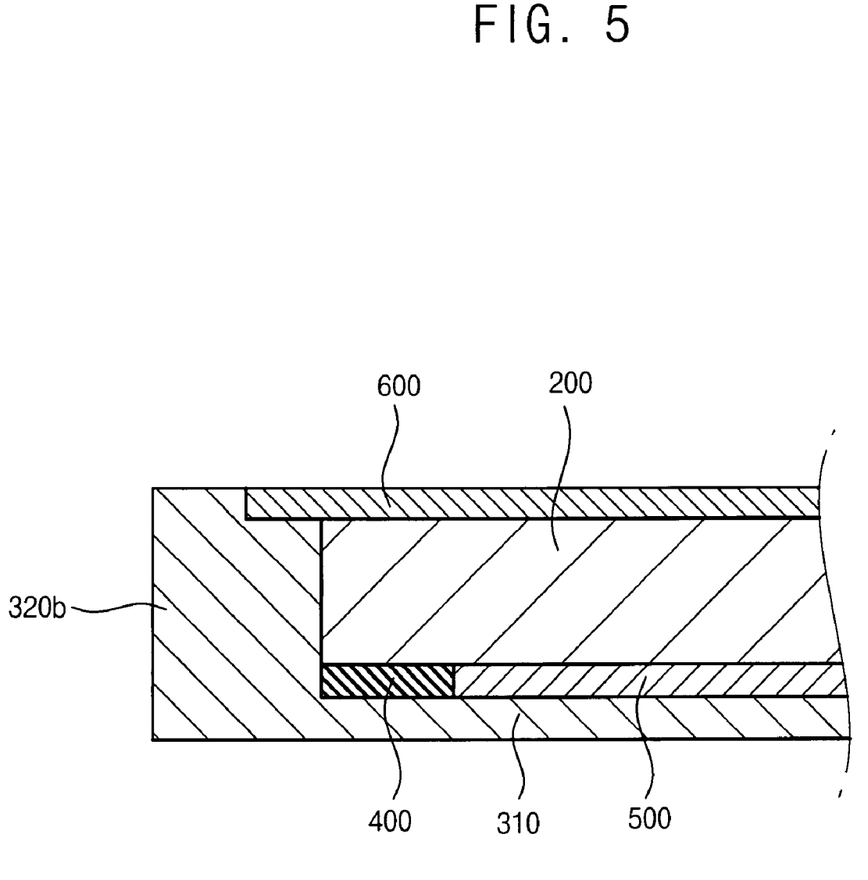
FIG. 5 is a cross-sectional view showing a light-receiving portion of the backlight assembly shown in FIG. 1.

FIG. 4 is a perspective view showing the receiving container and the adhesive member shown in FIG. 1, and FIG. 5 is a cross-sectional view showing a light adjusting portion of the backlight assembly shown in FIG. 1.

Referring to FIGS. 4 and 5, the receiving container 300 includes the bottom part 310, and the side part 320 vertically extending from the edge of the bottom part 310. The bottom part 310 includes a plurality of ribs 312 and an aperture 314 formed between the plurality of ribs 312. The side part 320 includes a first sidewall 320a, a second sidewall 320b facing the first sidewall 320a, a third sidewall 320c vertically extending from one side of the first sidewall 320a, and a fourth sidewall 320d connected with the second sidewall 320b to face the third sidewall 320c. On the upper surface of the third and fourth sidewalls 320c and 320d, a fixing protrusion 322 is provided for securing the optical sheet 600 to the receiving container 300. The optical sheet 600 is affixed to the receiving container 300 by inserting the fixing hole 622 of the first sheet fixing part 620 into the fixing protrusion part 322.

The adhesive member 400 is attached to the bottom part 310 adjacent to the second sidewall 320b. The adhesive member 400 affixes the LGP 200 to the receiving container 300 by being disposed between the bottom part 310 and the LGP 200. An adhesive material is formed on the upper and lower surfaces of the adhesive member 400 for affixing the LGP 200 to the receiving container 300. For example, the adhesive member 400 may be a base film containing Poly Ethylene Terphthalate (PET) or a double-sided tape with an adhesive layer formed on the upper and lower surfaces of the base film. Therefore, the upper surface of the adhesive member 400 is attached to the LGP 200 and the lower surface of the adhesive member 400 is attached to the bottom part 310. The reflecting sheet 500 is positioned so as not to overlap the adhesive member 400. Further, the adhesive member 400 may be colored black for preventing a leakage light from the light adjusting part of the LGP 200 opposite the lamp 110.

Figure 6:
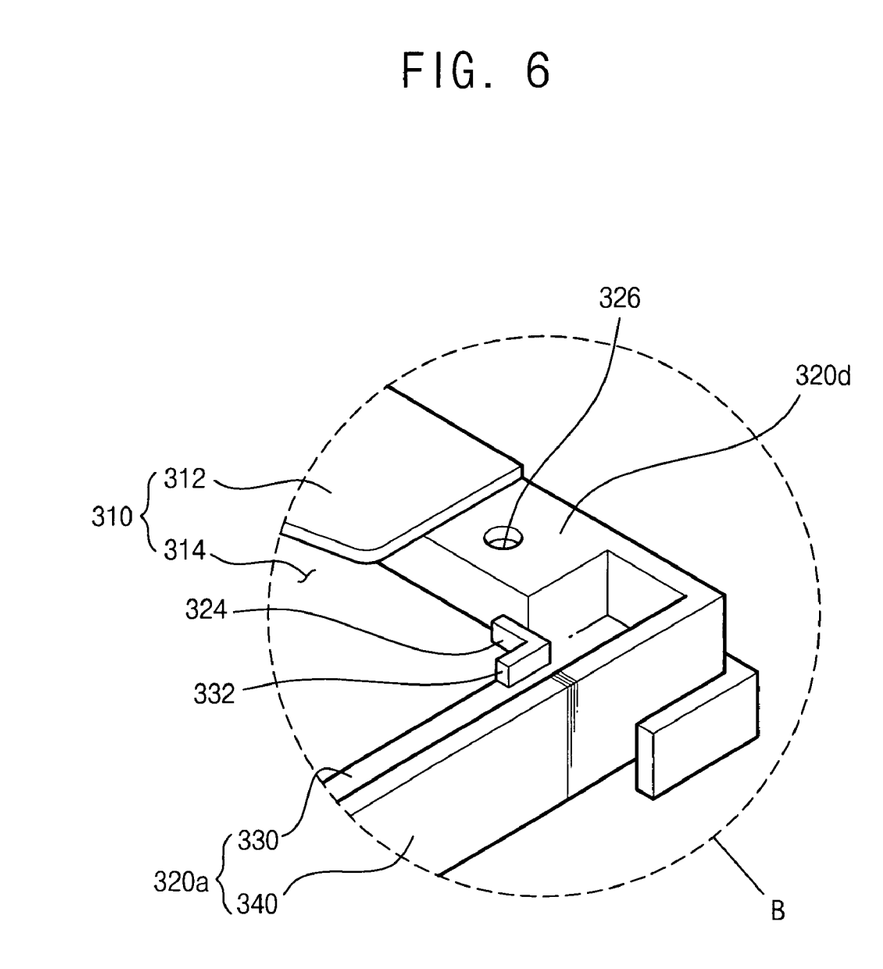
FIG. 6 is an enlarged view of the underside of region "B" shown in FIG. 4.
Figure 7:
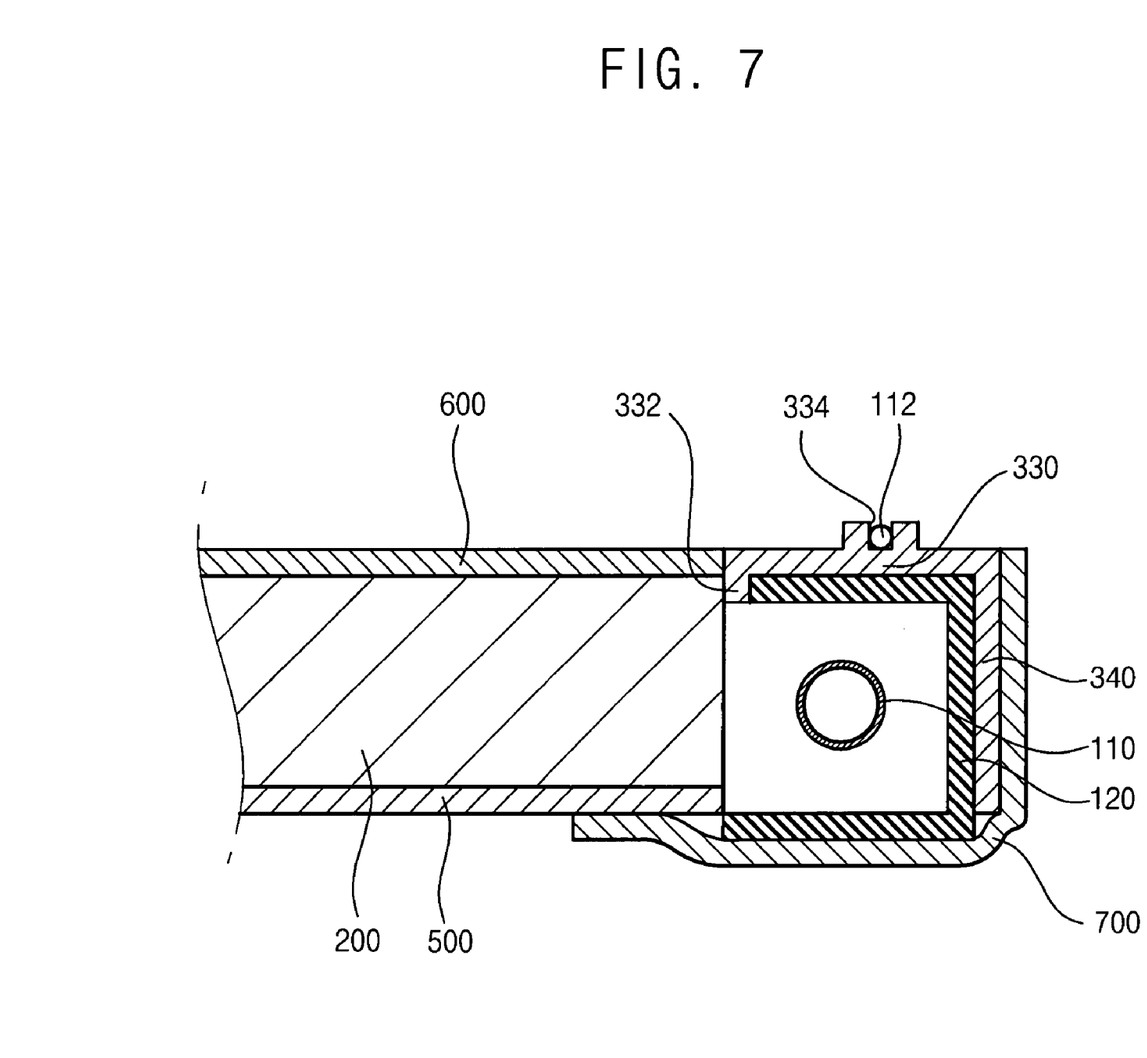
FIG. 7 is a cross-sectional view showing a light-receiving portion of the backlight assembly shown in FIG. 1.

FIG. 6 is a perspective view showing the underside of region "B" shown in FIG. 4, and FIG. 7 is a cross-sectional view showing a light receiving portion of the backlight assembly shown FIG. 1.

Referring to FIGS. 6 and 7, the first sidewall 320a includes an upper surface 330 and a side surface 340. The upper surface 330 covers the upper part of the lamp assembly 100 and the side surface 340 covers the side part of the lamp assembly 100. The upper surface 330 further includes a first protrusion 332 protruding at a predetermined height toward the bottom part 310. As shown in FIG. 6, the first protrusion 332 is formed adjacent to a first edge contacting the first and fourth sidewalls 320a and 320d. Further, it should be noted that the first protrusion 332 is formed adjacent to a second edge contacting the first and third sidewalls 320a and 320c. The first protrusion 332 prevents the LGP 200 from moving toward the lamp assembly 100. A guide hole 334 is formed on the upper surface 330 of the first sidewall 320a for affixing a lamp wire 112. The lamp wire 112 is connected to both sides of a lamp 110 for applying a driving voltage.

The receiving container 300 may further include a second protrusion 324 formed at the third and fourth sidewalls 320c and 320d. The second protrusion part 324 protrudes a predetermined height from the inner surface of the LGP 200. As shown in FIG. 6, the second protrusion 324 is formed adjacent to a first edge contacting the first and fourth sidewalls 320a and 320d. It should be noted that the second protrusion 324 is formed adjacent to a second edge contacting the first and third sidewalls 320a and 320c. Further, the second protrusion 324 may be connected to the first protrusion 332. The second protrusion 324 guides the LGP so that the LGP 200 is separated by a certain distance from the third and fourth sidewalls 320c and 320d. According to this configuration, when the LGP 200 expands due to heat from the lamp 110, the space between the LGP 200 and the third sidewall 320c, and between the LGP 200 and the fourth sidewall 320d prevents modification of the LGP 200.

The lamp assembly 100 and the back cover 700 are mounted on the first sidewall 320a at the bottom part of the receiving container 300. The bottom surface of the lamp reflecting plate 120 is exposed through the aperture 314. The back cover 700 is connected with the receiving container 300 to cover the first sidewall 320a and some area of the bottom part 310. The back cover 700 contacts the lamp reflecting plate 120 exposed through the aperture 314. According to this configuration, the back cover 700 prevents the lamp assembly 100 mounted in the receiving container 300 from being separated from the receiving container 300. In addition, the back cover 700 emits heat from the lamp assembly 100 to the surrounding area. Therefore, the back cover 700 may be made from a metal material having a high thermal conductivity. A first connecting hole 326 is formed on the third and fourth sidewalls 320c and 320d for connecting the lamp reflecting plate 120 and the back cover 700 by fasteners (e.g. screws).

Figure 8:
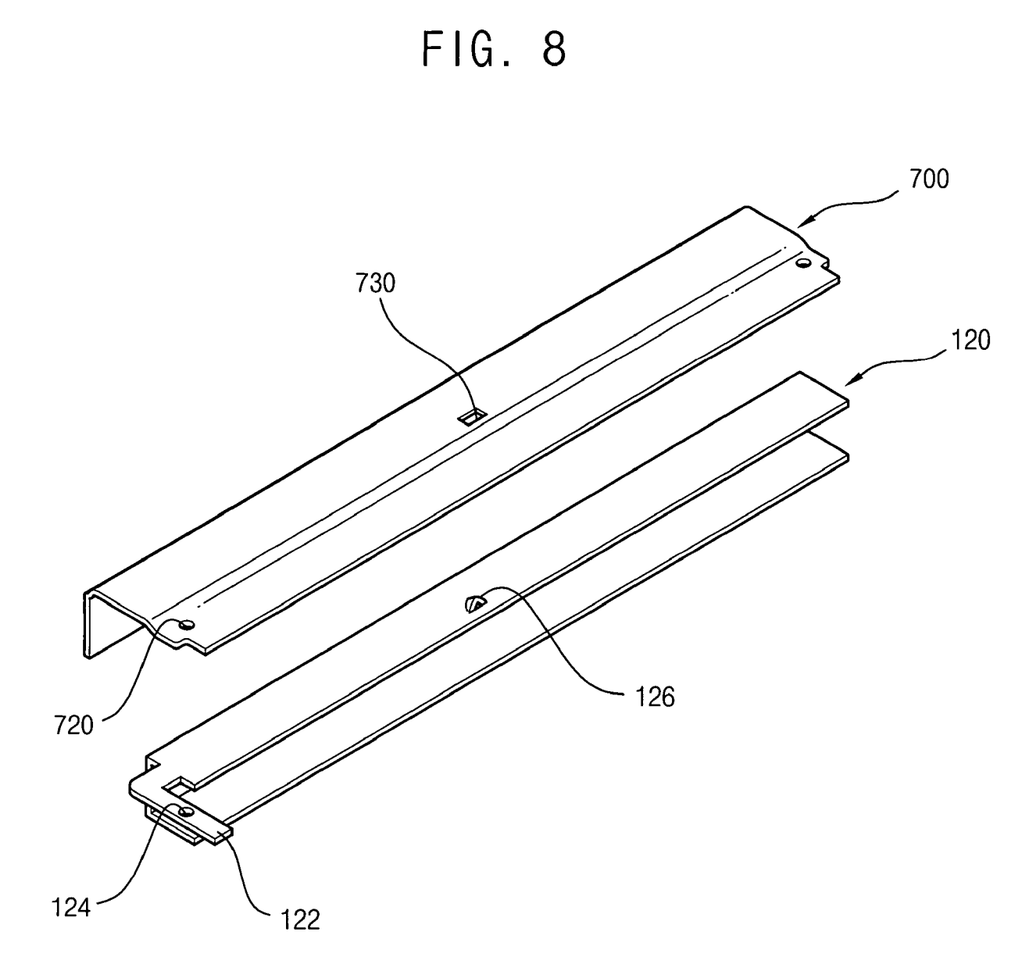
FIG. 8 is a perspective view showing a reflecting plate and a back cover shown in FIG. 1.

FIG. 8 is a perspective view showing the lamp reflecting plate and the back cover shown in FIG. 1. Referring to FIG. 8, the lamp reflecting plate 120 includes a connecting part 122 extended from its one side corresponding to the third and fourth sidewalls 320c and 320d. The connecting part 122 has a first hole 124 corresponding to the first connecting hole 326 formed at the third or fourth sidewalls 320c and 320d. The lamp reflecting plate 120 is affixed to the first sidewall 320a via a fastener (e.g. a screw) extending through the first hole 124 and the first connecting hole 326.

The back cover 700 has a second hole 720 corresponding to the first connecting hole 326 formed the third and fourth sidewalls 320c and 320d. The back cover 700 is fixed to the receiving container 300 via a fastener (e.g. a screw) extending through by the second hole 720 and the first connecting hole 326. The lamp reflecting plate 120 further includes a hook 126 protruding from its bottom surface, and the back cover 700 further includes a connecting hole 730 formed to meet the hook 126. The lamp reflecting plate 120 is affixed to the receiving container 300 through the connecting part 122 formed at one side or both sides of is the lamp reflecting part 210. Further, the hook 126 of the lamp reflecting plate 120 is connected with the connecting hole 730. This configuration prevents the lamp reflecting part 120 from sliding toward the LGP 200.

Figure 9:
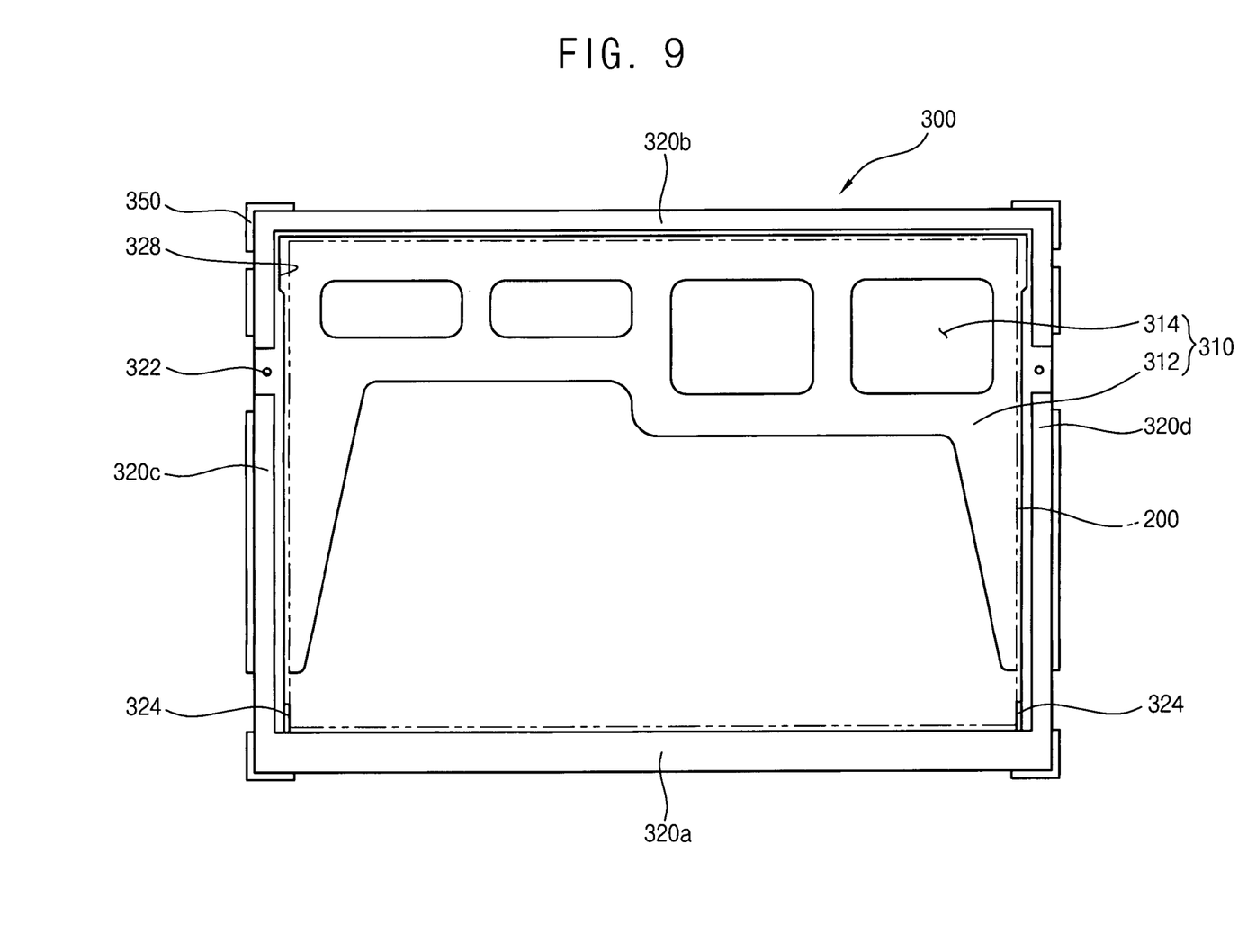
FIG. 9 is a plan view of the receiving container shown in FIG. 4.
Figure 10:
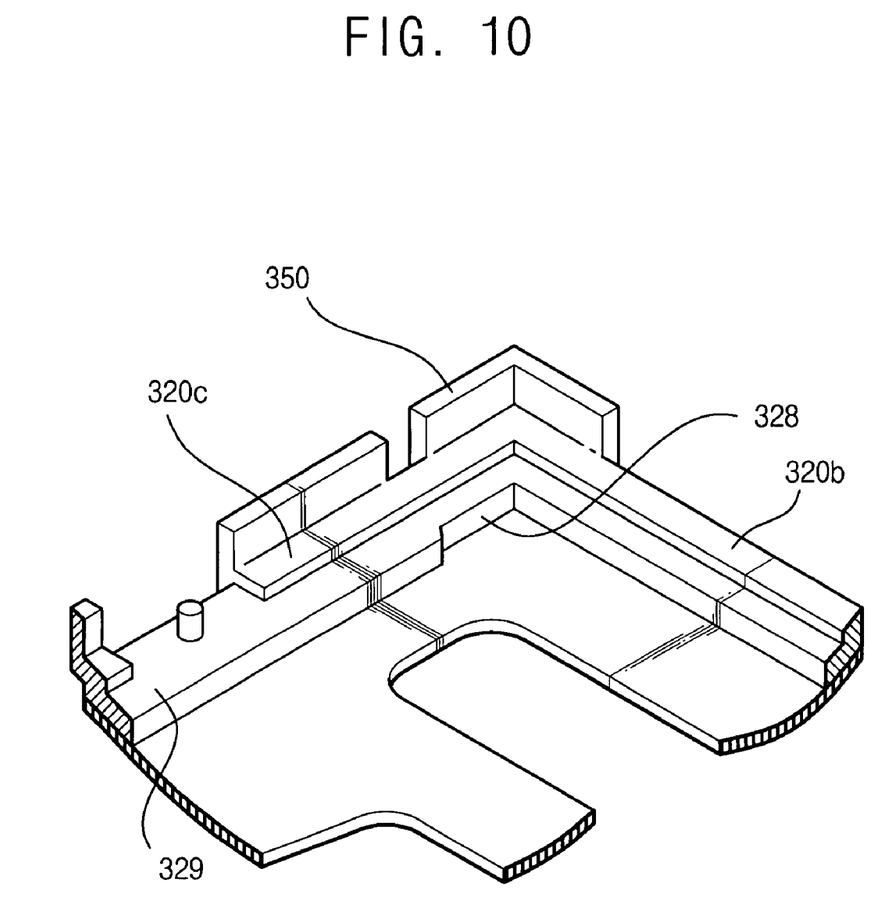
FIG. 10 is a perspective view showing a third edge portion in contact with second and fourth sidewalls of the receiving container shown in FIG. 4.

FIG. 9 is a plan view showing the receiving container shown in FIG. 4, and FIG. 10 is a perspective view showing a third edge part that meets the second and fourth sidewalls 320b and 320d.

Referring to FIGS. 9 and 10, the second protrusion 324 is formed on the third and fourth sidewalls 320c and 320d corresponding to the light receiving portion. The LGP 200 is mounted so that the second protrusion 324 distances the LGP 200 from the third and fourth sidewalls 320c and 320d by a predetermined distance. A recess 328 may also be formed on the third and fourth sidewalls 320c and 320d to accommodate the light adjusting portion. The recess 328 has a predetermined depth from the inner surface of the third and fourth sidewalls 320c and 320d. Further, the recess 328 is formed to meet the light adjusting part, and thus may prevent the LGP 200 from being bent and prevent an edge part of the LGP 200 from being broken.

As shown in FIGS. 9 and 10, a protrusion 329 is formed on the upper surface of the first, second, third and fourth sidewalls 320a, 320b, 320c and 320d for guiding the receiving location of the optical sheet 600 mounted on the upper part of the LGP 200. The fixing protrusion 322 is formed on the upper surface of the third and fourth sidewalls 320c and 320d for securing the optical sheet 600.

The receiving container 300 further includes a guiding part 350 that is formed around a first edge contacting the first and fourth sidewalls 320a and 320d, a second edge contacting the first and third sidewalls 320a and 320c, a third edge contacting the second and third sidewalls 320b and 320c, and a fourth edge contacting the second and fourth sidewalls 320b and 320d, respectively. The guiding part 350 is formed to be higher than the upper surface of the first, second, third and fourth sidewalls 320a, 320b, 320c and 320d. The guiding part 350 guides the connecting location of a liquid crystal display device (not shown).

Figure 11:
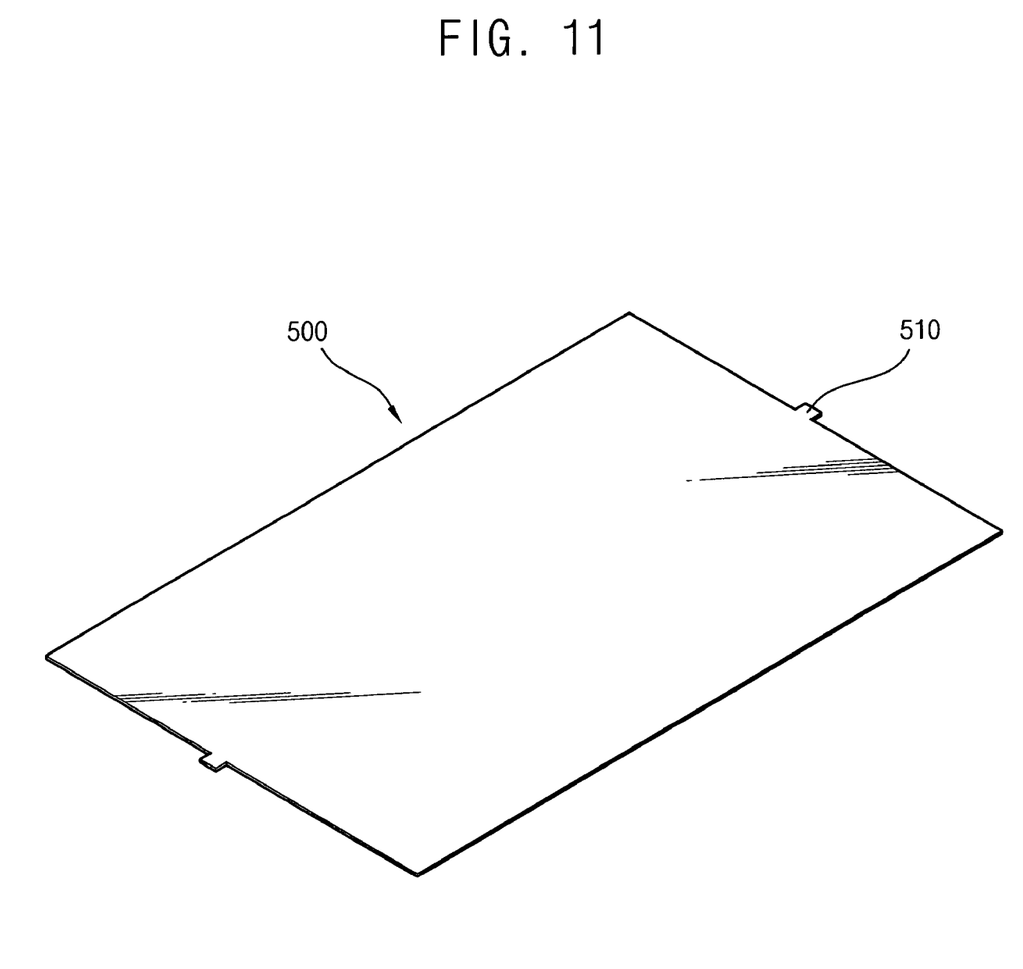
FIG. 11 is a perspective view showing the reflecting sheet shown in FIG. 1.
Figure 12:
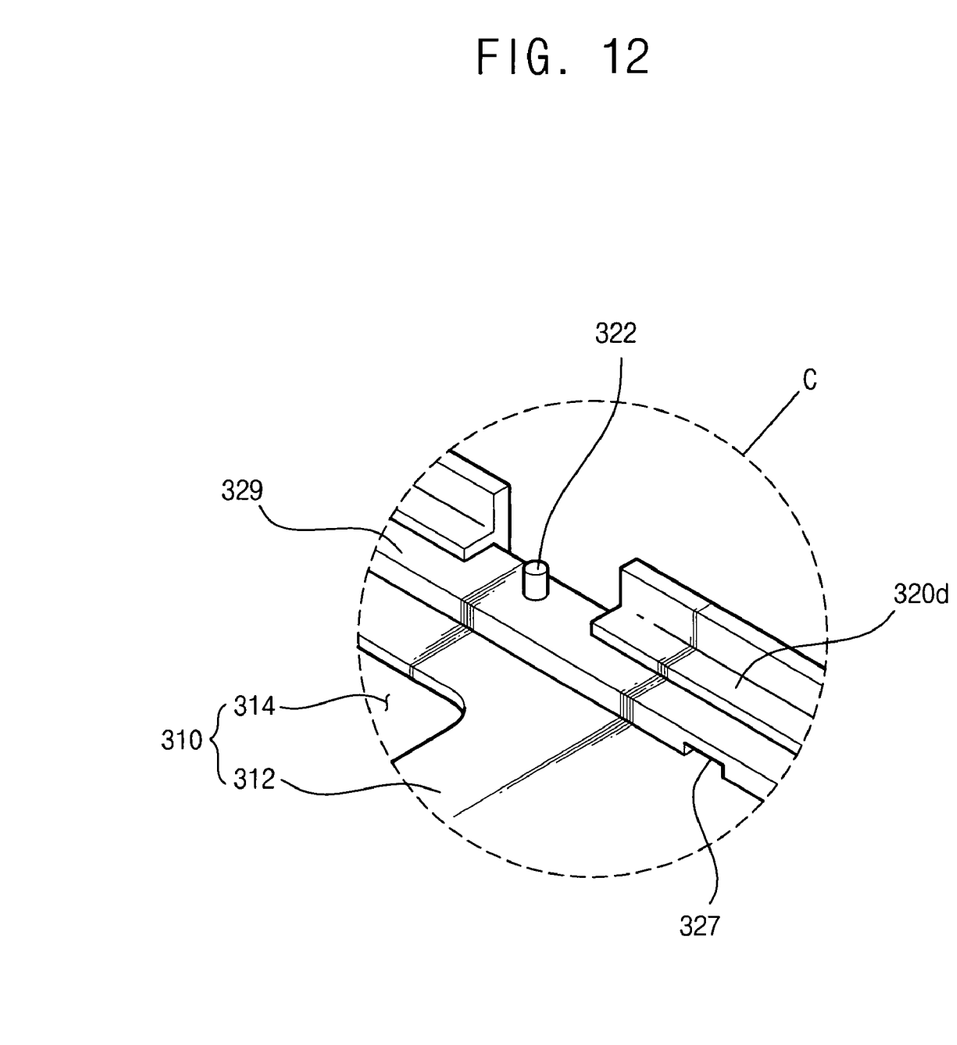
FIG. 12 is an enlarged view of region "C" shown in FIG. 4.

FIG. 11 is a perspective view showing the reflecting sheet shown in FIG. 1, and FIG. 12 is an enlarged view of region "C" shown in FIG. 4.

Referring to FIGS. 11 and 12, the reflecting sheet 500 is positioned on the bottom part 310 of the receiving container 300. The reflecting sheet 500 is made of, for example, a PET material or Poly Carbonate (PC) material, etc. A reflecting layer is formed on the upper surface of the reflecting sheet 500 for reflecting light. A second sheet fixing part 510 is formed on both sides of the reflecting sheet 500 for affixing the reflecting sheet 500 to the receiving container 300, respectively.

As shown in FIG. 12, an insert hole 327 is formed on the third and fourth sidewalls 320c and 320d to receive the second sheet fixing part 510. The insert hole 327 is a hole formed in the inner surface of the third and fourth sidewalls 320c and 320d that receives the second sheet fixing part 510. The reflecting sheet 500 is affixed to the receiving container 300 by inserting the second sheet fixing part 510 into the insert hole 327. This configuration eliminates an additional adhesive unit for attaching the reflecting sheet 500 to the receiving container 300.

Figure 13:
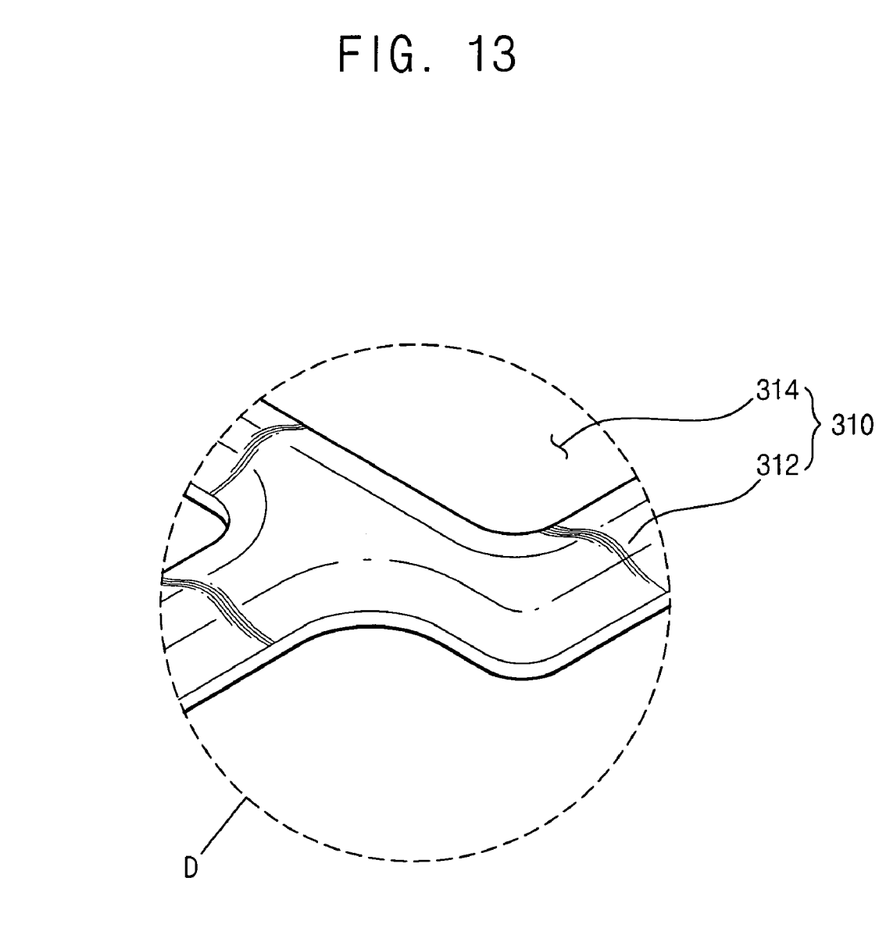
FIG. 13 is an enlarged view of region "D" shown in FIG. 4.

FIG. 13 is an enlarged view of region "D" shown in FIG. 4. Referring to FIG. 13, the bottom part 310 of the receiving container 300 includes a plurality of ribs 312 partially connected to each other, and aperture 314 disposed between the ribs 312. The ribs 312 support the reflecting sheet 500, the LGP 200, and the optical sheet 600 that are mounted on the receiving container 300. The ribs 312 may be formed using minimal area of the bottom part 310 for reducing weight.

The inner surface of the ribs 312 facing the reflecting plate 500 and the LGP 200 is tapered from the center of the ribs 312 to an edge adjacent to the aperture 314. This configuration prevents the first prism pattern of the LGP 200 from being modified by reducing contact between the first prism pattern and the ribs 312.

Figure 14:
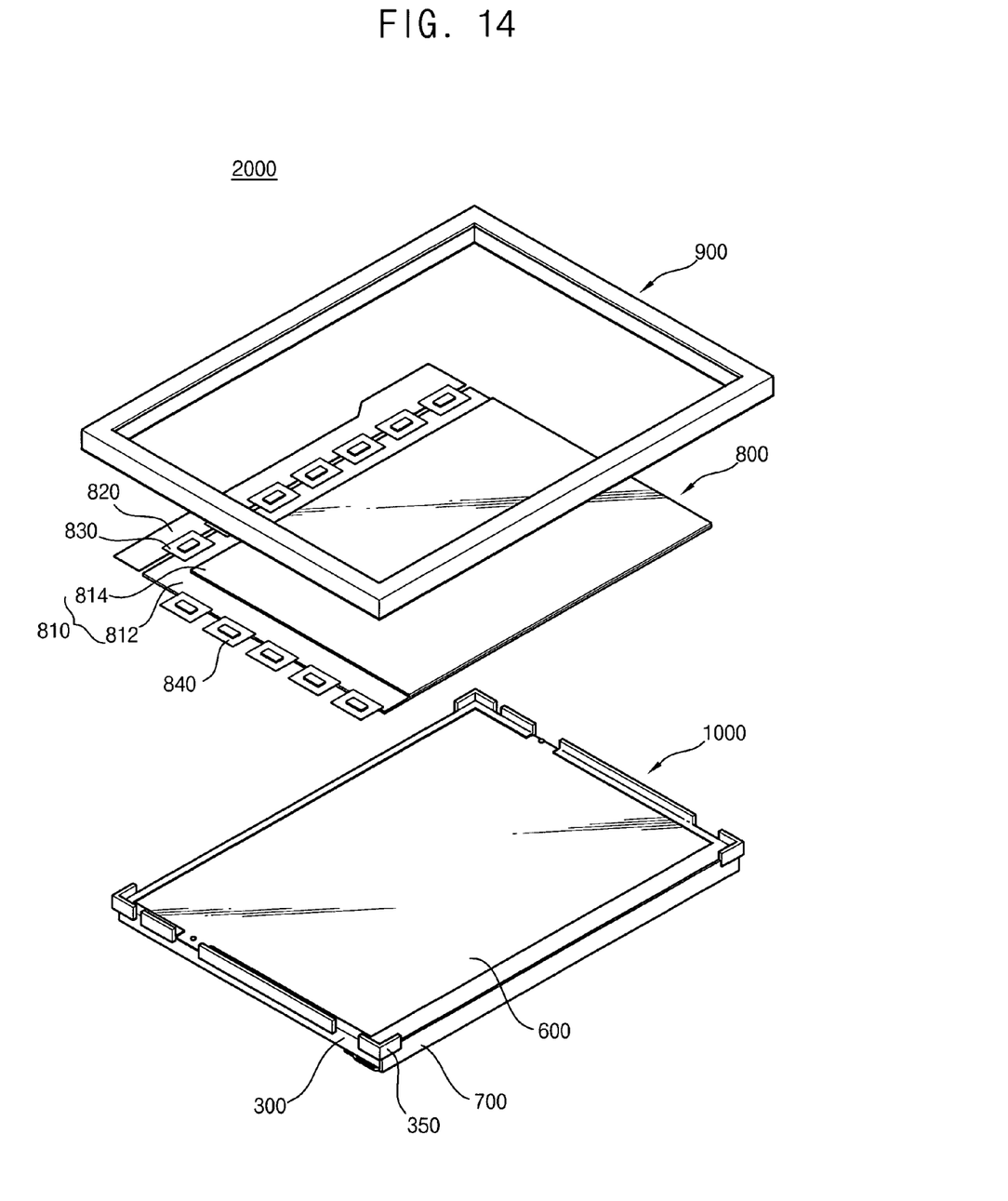
FIG. 14 is a cut out perspective view showing a liquid crystal display apparatus according to an embodiment of the present invention.

FIG. 14 is a perspective view showing a liquid crystal display device according to an embodiment of the present invention. In this embodiment, since the backlight assembly 1000 has the same structure as that described with reference to FIGS. 1 to 13, the detailed description of the backlight assembly 1000 will be omitted, and the same reference numerals used for corresponding elements.

Referring to FIG. 14, the liquid crystal display device 2000 includes the backlight assembly 1000, a display unit 800 for displaying images, and a top chassis 900 for fixing the display unit 800 to the backlight assembly 1000. The display unit 800 includes a liquid crystal panel 810, a source Printed Circuit Substrate (PCB) 820, a Tape Carrier Package (TCP) 830, and a gate TCP 840. The liquid crystal panel 810 includes a Thin Film Transistor (TFT) substrate 812, a color filter (CF) substrate 814 and a liquid crystal (not shown) disposed between the TFT and CF substrates 812 and 814.

The TFT substrate 812 is a transparent glass substrate having TFTs (not shown) formed in a matrix. The source terminal of the TFT is connected to a data line, the gate terminal of the TFT is connected to a gate line, and the drain terminal of the TFT is connected to a pixel electrode being made of a transparent conductive material. The CF substrate 814 is a substrate that RGB filters are formed. A common electrode is formed on the whole surface of the CF substrate 814.

The source PCB substrate 820 is connected to one side of the TFT substrate 812 through the data TCP 830. The source PCB substrate 820 generates data driving signals and gate driving signals, and outputs them to the liquid crystal panel 810. The data driving signals are signals for controlling the data line formed on the TFT substrate 812, and are applied to the data line through the data TCP 830. The gate driving signals are signals for controlling the gate line formed on the TFT substrate 812, and are applied to the gate line through the data TCP 820 and the gate TCP 830. Therefore, a conductive wiring (not shown) is formed on the TFT substrate 812 for connecting the data TCP 820 and the gate TCP 830.

The display unit 800 is mounted on the upper surface of the backlight assembly 1000. The liquid crystal panel 810 is located on the upper surface of the receiving container 300 and the mounted location is guided by the guide part 350 formed around four edges of the receiving container 300. The source PCB substrate 820 is fixed to the rear of the receiving container 300 by bending the data TCP 820.

The top chassis 900 is connected to the receiving container 300 to cover the edge part of the liquid crystal panel 810. The top chassis 900 prevents the liquid crystal panel 810 from escaping from the backlight assembly 1000 and prevents the liquid panel 810 from be damaged by external impact.

The prevent invention may retain the LGP without an additional process, and may prevent poor appearance by affixing the LGP with the prism pattern by an adhesive member and supported by a plurality of tapered ribs.

Having described the embodiments of the present invention and its advantages, it should be noted that various changes, substitutions and alterations can be made herein without departing from the spirit and scope of the invention as defined by appended claims.

What is claimed is:

1. A backlight assembly comprising:
   a lamp assembly configured to include a lamp and a lamp reflecting plate;
   a light guide plate configured to change a path of light from the lamp assembly;
   a receiving container configured to include a bottom part, and a side part extending from the bottom part to receive the lamp assembly and the light guide plate; and
   an adhesive member configured to affix the light guide plate to the receiving container.

2. The backlight assembly of claim 1, wherein the light guide plate further includes a prism pattern formed on a surface.

3. The backlight assembly of claim 2, wherein the prism pattern is formed in a direction perpendicular to the longitudinal axis of the lamp.

4. The backlight assembly of claim 3, wherein the prism pattern has a triangular shape.

5. The backlight assembly of claim 1, wherein the side part of the receiving container comprises:
   a first sidewall configured to have the lamp assembly mounted thereon;
   a second sidewall configured to face the first sidewall;
   a third sidewall configured to be extended from the first sidewall and to contact the second sidewall; and
   a fourth sidewall configured to face the third sidewall and to contact the first and second sidewalls.

6. The backlight assembly of claim 5, wherein the adhesive member is mounted on the bottom part of the receiving container adjacent to the second sidewall.

7. The backlight assembly of claim 6, wherein the bottom of the adhesive member is attached to the bottom part of the receiving container and the top of the adhesive member is attached to the light guide plate.

8. The backlight assembly of claim 5, wherein the first and second sidewalls include a first protrusion adjacent to edges of the third and fourth sidewalls, the third and fourth sidewalls including a second protrusion adjacent to edges of the first and second sidewalls.

9. The backlight assembly of claim 1, further comprising:
   an optical sheet configured to be mounted on the top of the light guide plate; and
   a reflecting sheet configured to be mounted on the bottom of the light guide plate, wherein the optical sheet has a prism pattern facing the top of the light guide plate.

10. The backlight assembly of claim 1, further comprising a back cover configured to cover the lamp assembly.

11. The backlight assembly of claim 10, wherein the lamp reflecting plate includes a connecting part, a first hole and a hook, and the back cover includes a second hole and a connecting hole corresponding to the first hole and the hook for connecting with the lamp reflecting plate.

12. A backlight assembly comprising:
   a lamp assembly configured to include a lamp and a lamp reflecting plate;
   a light guide plate configured to change a path of light from the lamp assembly;
   a receiving container configured to include a bottom part and a side part to be extended from the bottom part to receive the lamp assembly and the light guide plate, the bottom part including a plurality of ribs and a plurality of apertures disposed between the ribs, at least one rib having a thickness tapered from the center of the rib to an edge of the rib adjacent to the aperture; and
   an adhesive member configured to fix the light guide plate to the receiving container.

13. The backlight assembly of claim 12, wherein the light guide plate has a prism pattern on a surface.

14. The backlight assembly of claim 13, wherein the prism pattern has a triangular shape.

15. The backlight assembly of claim 12, wherein the adhesive member is attached to the light adjusting portion of the light assembly.

16. The backlight assembly of claim 12, further comprising:
- an optical sheet configured to be mounted on the top of the light guide plate; and
- a reflecting sheet configured to be mounted on the bottom of the light guide plate, wherein the optical sheet has a prism pattern facing the top of the light guide plate.

17. A liquid crystal display device comprising:
- a backlight assembly configured to include a lamp assembly having a lamp and a lamp reflecting plate, a light guide plate changing a path of light from the lamp assembly, a receiving container having a bottom part and a side part extending from the bottom part to receive the lamp assembly and the light guide plate, and an adhesive member fixing the light guide plate to the receiving container;
- a display unit configured to display images by using light from the backlight assembly; and
- a top chassis configured to fix the backlight assembly to the display unit;
- wherein the light guide plate has a prism pattern formed on a surface thereof.

18. The liquid crystal display device of claim 17, wherein the adhesive member is double-sided tape and is attached to the light adjusting portion of the lamp assembly.

19. The liquid crystal display device of claim 17, wherein the bottom part of the receiving container includes a plurality of ribs and a plurality of apertures disposed between the ribs, and at least one rib having a thickness tapered from the center of the rib to an edge of the rib adjacent to the aperture.

20. The liquid crystal display device of claim 17, wherein the side part of the receiving container includes first, second, third and fourth sidewalls, and protrusions are mounted around edges of the first, second, third and fourth sidewalls.

21. The liquid crystal display device of claim 17, further comprising:
- an optical sheet configured to be mounted on the top of the light guide plate; and
- a reflecting sheet configured to be mounted on the bottom of the light guide plate,
- wherein the optical sheet has a prism pattern facing the top of the light guide plate.

* * * * *